United States Patent [19]
Ueno et al.

[11] Patent Number: 5,150,432
[45] Date of Patent: Sep. 22, 1992

[54] APPARATUS FOR ENCODING/DECODING VIDEO SIGNALS TO IMPROVE QUALITY OF A SPECIFIC REGION

[75] Inventors: Hideyuki Ueno, Fujisawa; Kenshi Dachiku, Tokyo, both of Japan

[73] Assignee: Kabushiki Kaisha Toshiba, Kawasaki, Japan

[21] Appl. No.: 673,416

[22] Filed: Mar. 22, 1991

[30] Foreign Application Priority Data

Mar. 26, 1990 [JP] Japan .................................. 2-73275
Jun. 29, 1990 [JP] Japan ................................. 2-173077

[51] Int. Cl.[5] ............................................. G06K 9/36
[52] U.S. Cl. ..................................... 382/56; 358/135; 358/136
[58] Field of Search ............................ 382/48, 50, 56; 358/133, 135, 136, 105

[56] References Cited

U.S. PATENT DOCUMENTS

| | | | |
|---|---|---|---|
| 4,706,260 | 11/1987 | Fedele et al. | 382/56 |
| 4,754,487 | 6/1988 | Newmuis | 382/56 |
| 4,802,006 | 1/1989 | Iinuma et al. | 358/135 |
| 4,847,677 | 7/1989 | Music et al. | 358/135 |
| 4,951,140 | 8/1990 | Ueno et al. | 358/136 |
| 4,975,978 | 12/1990 | Ando et al. | 382/50 |
| 4,991,009 | 2/1991 | Suzuki et al. | 358/135 |

OTHER PUBLICATIONS

SPIE vol. 804 Advances in Image Processing (1987) R.H.J.M. Plompen et al., pp. 379–384.
ITEJ Tech. Rep., Y. Nagashima et al., 1987 "Detection and Tracking Method of Human Area in Video Signal", pp. 17–24.

Primary Examiner—Jose Couso
Attorney, Agent, or Firm—Oblon, Spivak, McClelland, Maier & Neustadt

[57] ABSTRACT

An image encoding apparatus comprises a region detecting circuit for detecting a specific region from input image signals and outputting the region specifying signal for discriminating the specific region from other regions, a low-pass filter for selectively filtering and outputting the image signals of regions other than the specific region in the input image signals, and an encoding circuit for encoding the image signal output from the low-pass filter.

19 Claims, 13 Drawing Sheets

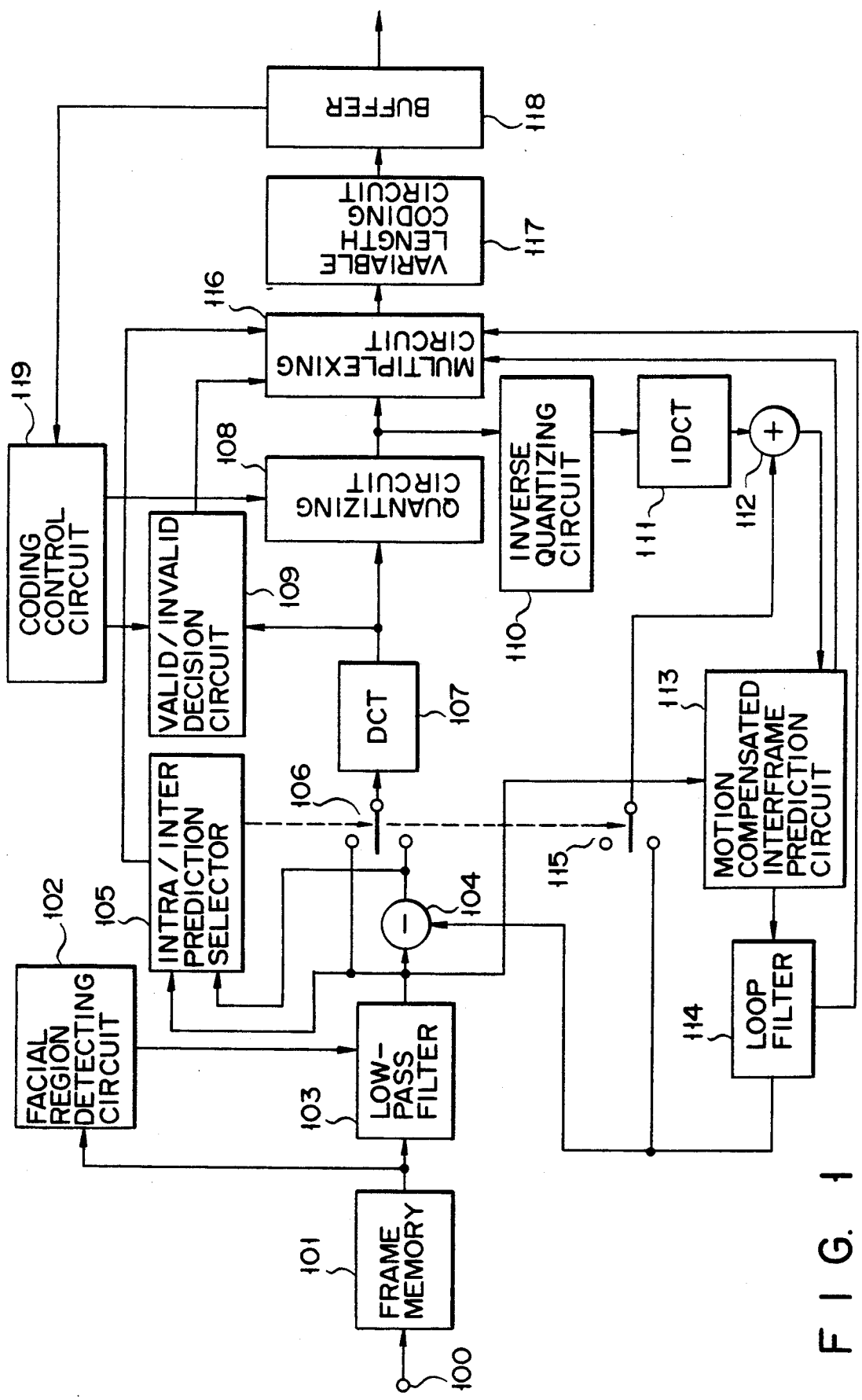
F I G. 1

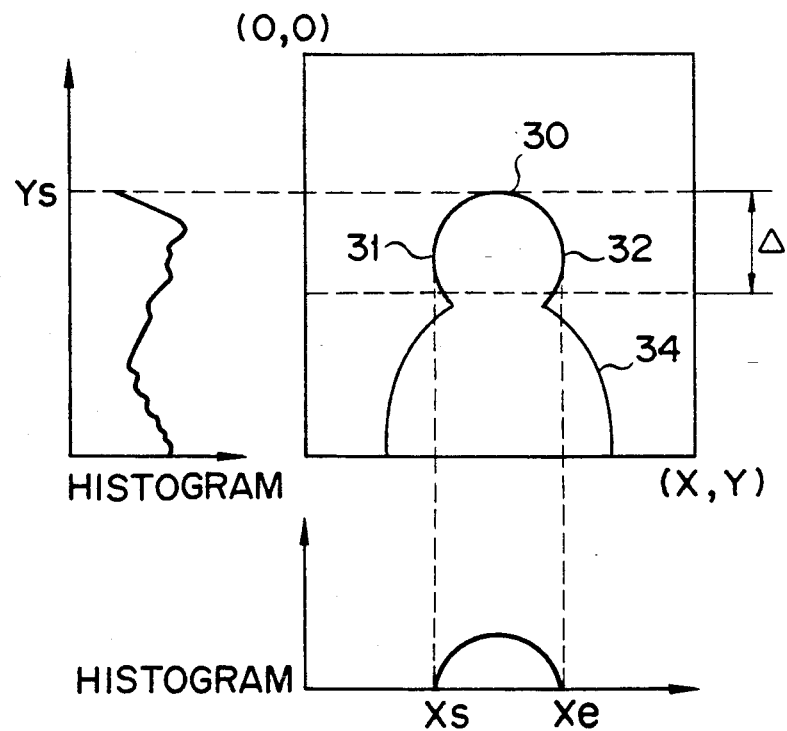
F I G. 3
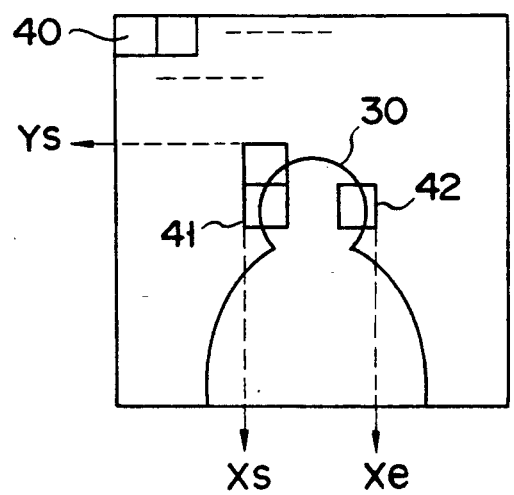
F I G. 4

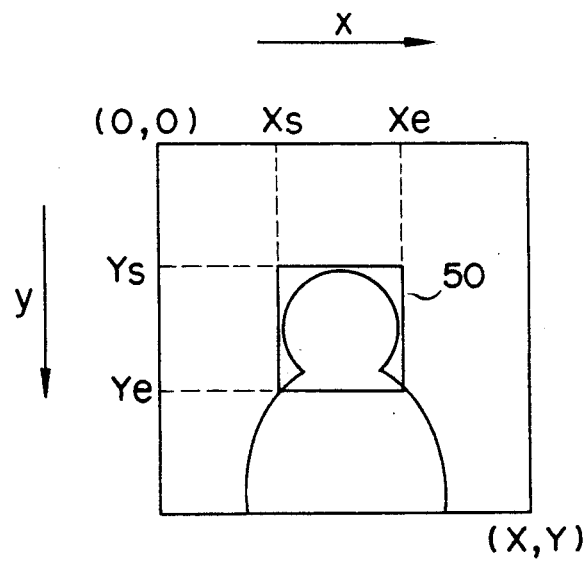
FRAME DIFFERENCE IMAGE
F I G. 5
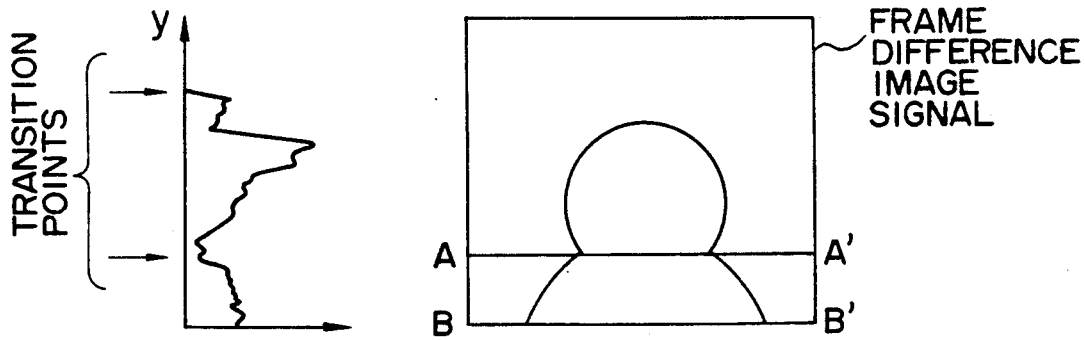
F I G. 7C   F I G. 7A
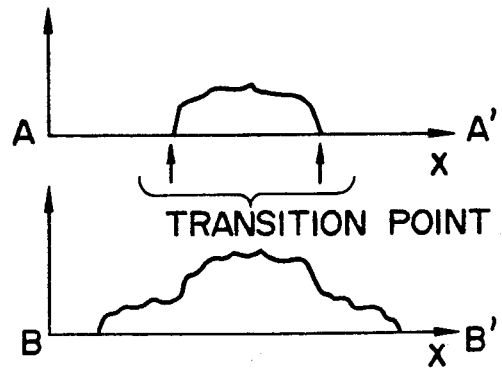
F I G. 7B

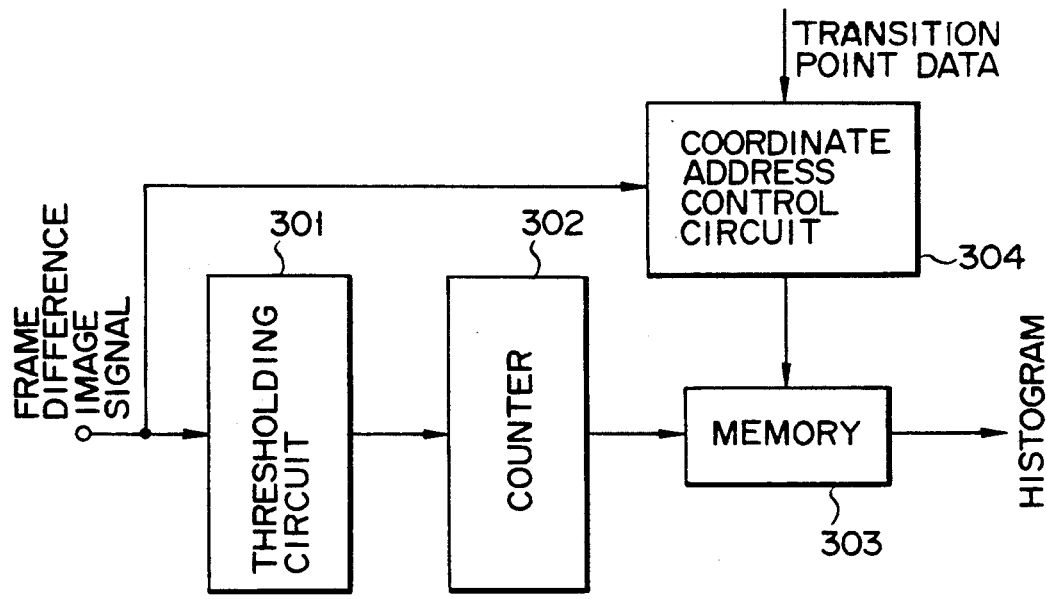
F I G. 8
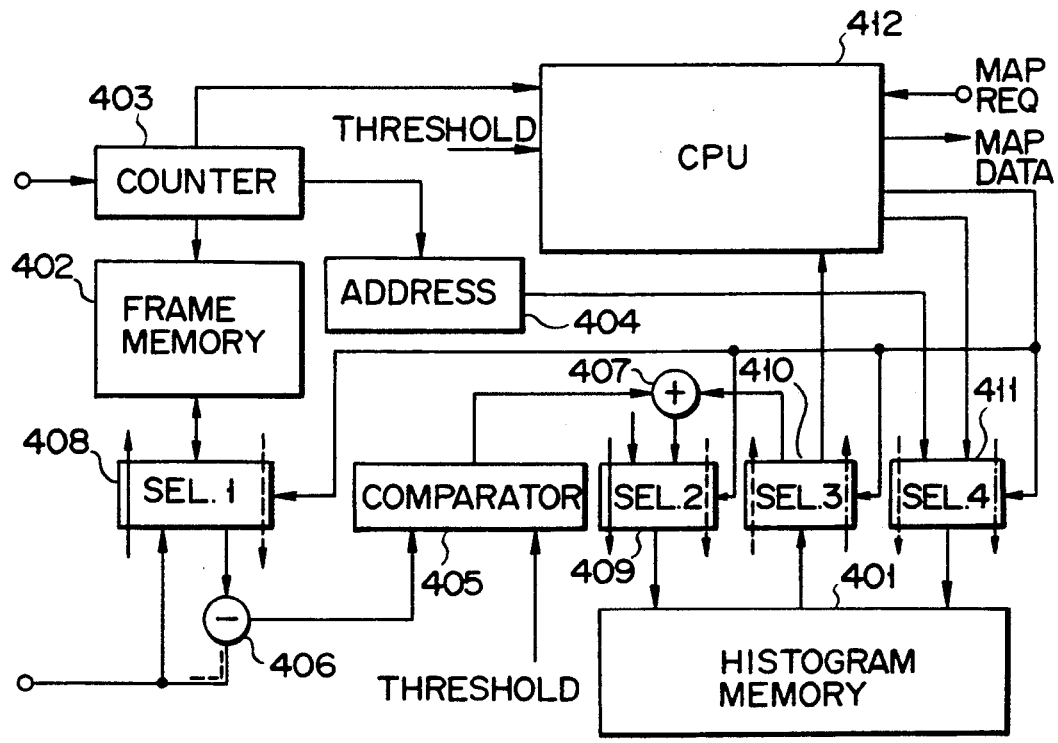
F I G. 9

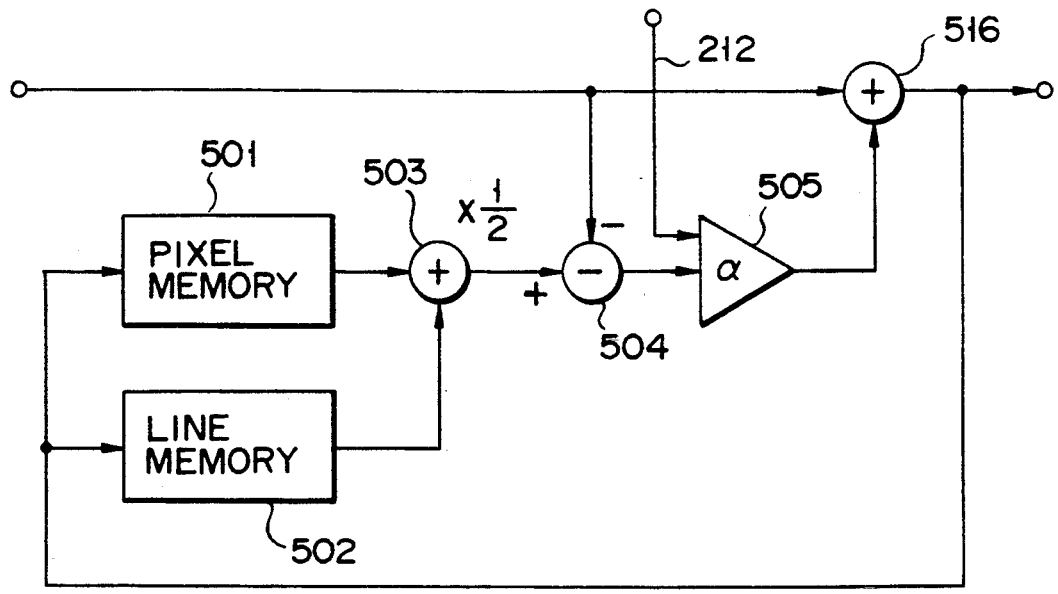
F I G. 10
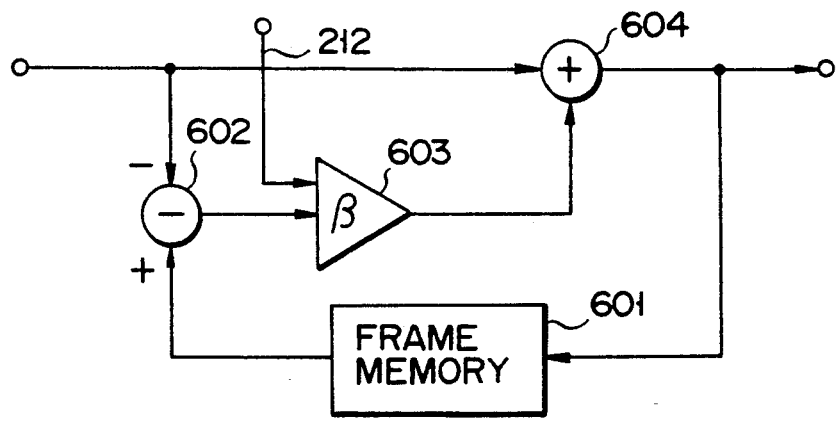
F I G. 11
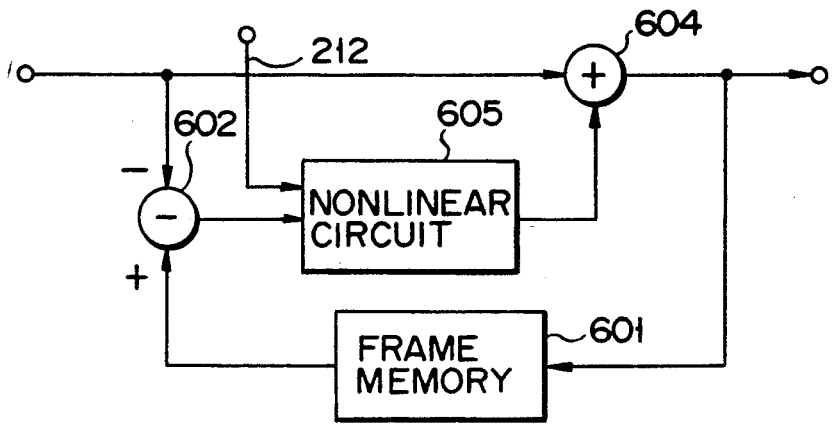
F I G. 12

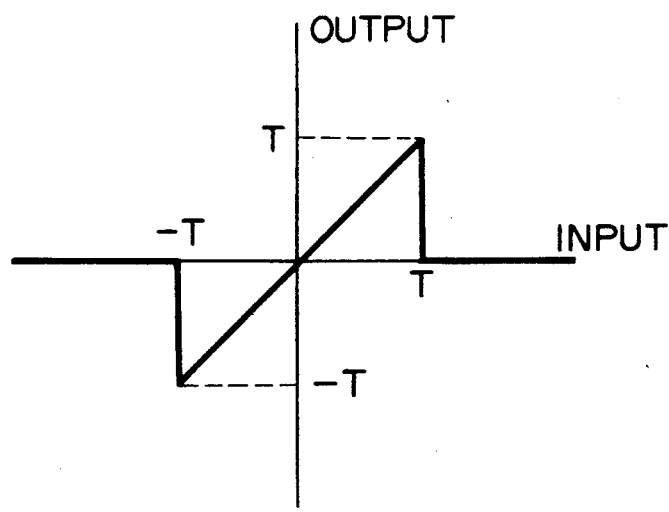
F I G. 13A
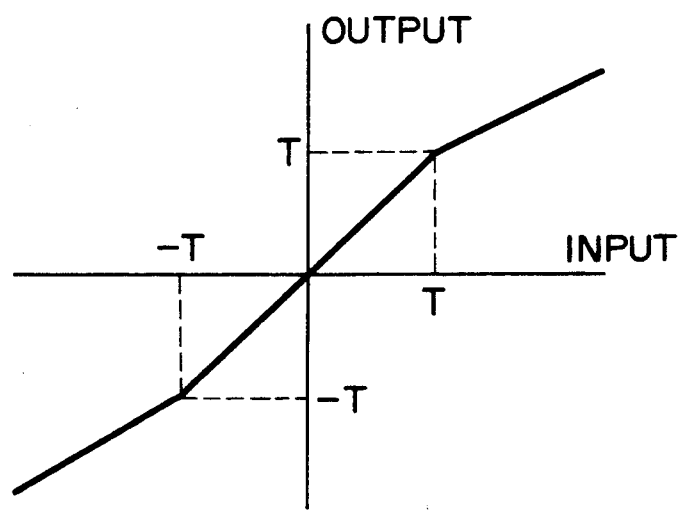
F I G. 13B

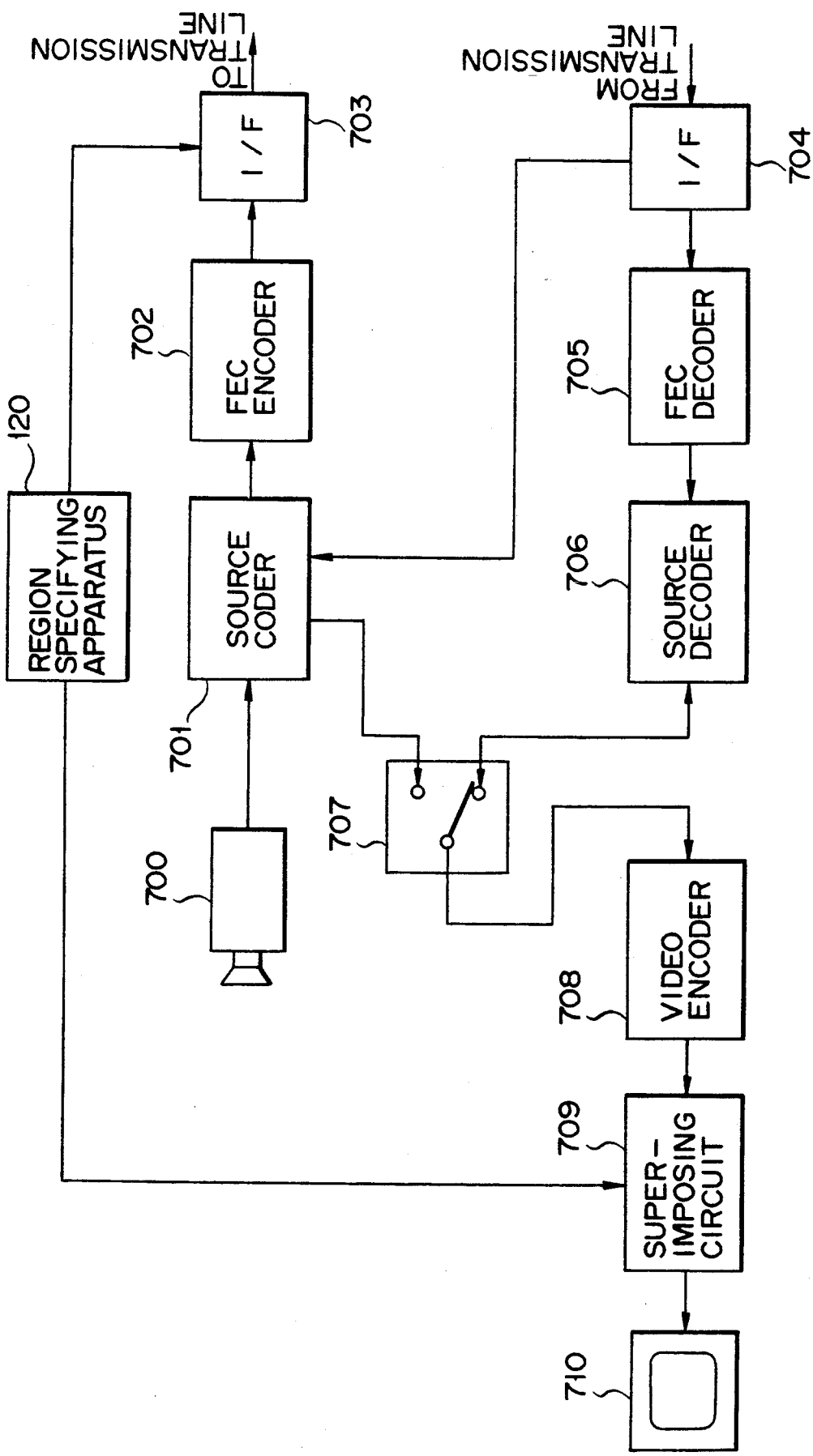
F I G. 21

APPARATUS FOR ENCODING/DECODING VIDEO SIGNALS TO IMPROVE QUALITY OF A SPECIFIC REGION

BACKGROUND OF THE INVENTION

1. Field of the Invention

The present invention relates to an apparatus for encoding video signals used for a teleconference or videophone.

2. Description of the Related Art

Video signal encoding systems have more positively been studied in recent years because they will be standardized soon. Also, intelligent encoding has been proposed as a future encoding system and encoding systems using knowledge of image in any form have been discussed as part of the study. As one of the encoding systems, the system is proposed to detect facial region from motion picture signals of human image and distribute many quantizing bit number to image signals of facial region.

For example, in the Preture Coding symposium Japan PCSJ89, 7-15 in 1989, the technique was disclosed to relatively improve the quality of decoded images of facial region by making the quantizing step size of regions other than facial region larger than the quantizing step size determined by the capacity of the buffer to store encoded data when quantizing DCT (Discrete Cosine Transform) coefficient obtained by DCT-encoding movement images. This technique, however, has the problem that visually-remarkably distortion peculiar to DCT-encoding such as block distortion is generated in decoded image because there are many quantization noise of DCT coefficient in regions other than facial region.

SUMMARY OF THE INVENTION

It is an object of the present invention to provide a movement image encoding apparatus capable of improving the quality of decoded images of specific region without generation of large distortion in regions other than specific region such as facial region.

According to the present invention, a specific region in image signals sequentially input for every frame is detected which corresponds to a movable image having the specific region and the region specifying signal to separate the specific region from other regions is output. Image signals of regions other than the specific region among input image signals ar selectively filtered by a low-pass filter according to the region specifying signal. And the image signals output from the low-pass filter are encoded by an encoding circuit.

According to the present invention, any specific region is specified by a region specifying apparatus and, thereby, the region specifying signal same as the above is output. Image signals of regions other than the specific region are selectively filtered according to the region specifying signal and, moreover, the image signals output from the low-pass filter means are encoded by an encoding circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an embodiment of the image encoding apparatus according to the present invention;

FIG. 3 is a view for explaining the principle for detection of facial region;

FIG. 4 is a view for explaining the principle for detection of facial region according to another method;

FIG. 5 is a view showing that the detected area is specified by a rectangle;

FIGS. 7A to 7C are views for explaining facial regions detecting the operation of the facial region detecting circuit in FIG. 6;

FIG. 8 is a block diagram showing a configuration of the histogram forming circuit used for the face detecting circuit in FIG. 6;

FIG. 9 is a block diagram showing another configuration of the facial region detecting circuit in FIG. 1;

FIG. 10 is a block diagram of an example of the low-pass filter in FIG. 1;

FIG. 11 is a block diagram of another example of the low-pass filter in FIG. 1;

FIG. 12 is a block diagram of still another example of the low-pass filter in FIG. 1;

FIGS. 13A and 13B are views showing input-output characteristic of the nonlinear circuit in FIG. 12;

FIG. 21 is a block diagram of another embodiment of the video telephone system using the image encoding apparatus according to the present invention.

DETAILED DESCRIPTION OF THE PREFERRED EMBODIMENTS

Figure 2A:
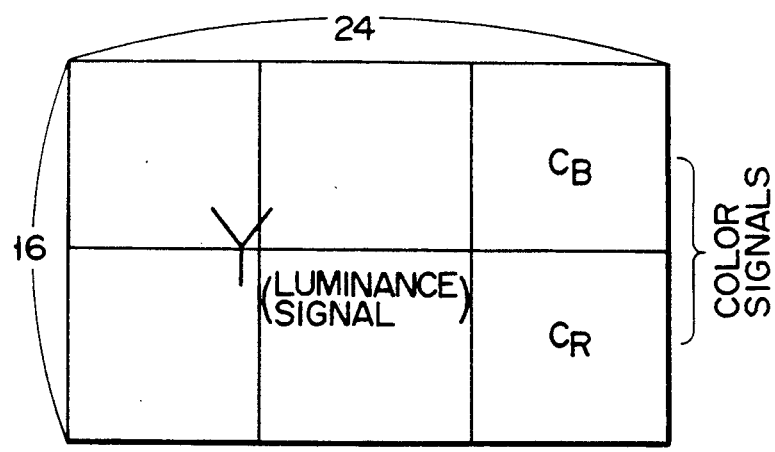
FIGS. 2A to 2D are views for explaining the format of macro block and that of the signal input to low-pass filter.

For simple explanation, an example using the Px64kbps standard video coding system (see CCITT recommendation H. 261) as an encoding system is described in the following embodiment. As a matter of course, the present invention can be applied to other encoding systems.

In the embodiment shown in FIG. 1, a terminal 100 for inputting movement image signals is connected to a frame memory 101 for storing image signals for one frame (this is called frame data). The readout terminal of the frame memory 101 is connected to the input terminal of a facial region detecting circuit 102 for detecting the human facial region of the frame data and that of a low-pass filter 103 for filtering the frame data. The output terminal of the facial region detecting circuit 102 is connected to the control terminal of the low-pass filter 103.

The configuration after the low-pass filter 103 is the same as that of a normal image encoding apparatus using said standard encoding system.

That is, the output of the low-pass filter 103 is connected to a subtracter 104, intra/interframe prediction selector 105, switch 106, and motion compensated interframe prediction circuit 113. The output terminal of the motion compensated interframe prediction circuit 113 connects with a loop filter 114. The motion compensated inter frame prediction circuit 113 comprises a frame memory, motion vector detecting circuit, and variable delay circuit to generate motion compensated interframe prediction signals in macro-blocks. The interframe prediction signal is sent to the subtracter 104 through the loop filter 114 and the difference from macro-block data output by the low-pass filter 103 is detected by the subtracter 104. The intra/interframe prediction selector 105 compares the power of the differential signal output by the subtracter 104 with that of the macro-block data signal output by the low-pass filter 103 to decide whether to execute interframe or interframe prediction. The switch 106 receives the prediction result from the intra/interframe prediction selector 105 to select the output signal of the subtracter 104 which is the interframe prediction signal or that of the low-pass filter 103 which is the interframe prediction signal.

The output terminal of the switch 106 is connected to the input terminal of a DCT (Discrete Cosine Transform) circuit 107. The output terminal of the DCT circuit 107 is connected to a quantizing circuit 108 and valid/invalid decision circuit 109. The DCT circuit 107 outputs DCT coefficient data. The quantizing circuit 108 quantizes each DCT coefficient data value to output, for example, a quantizing-table number and quantizing index. The valid/invalid decision circuit 109 calculates the signal power for each block with DCT coefficient data to decide whether the block is valid or invalid.

The output terminal of the quantizing circuit 108 is connected to the input terminal of an inverse quantizing circuit 110. The output terminal of the inverse quantizing circuit 110 is connected to the input terminal of an inverse DCT circuit 111 which executes processing inversely to the DCT circuit 107. The output terminal of the inverse DCT circuit 111 is connected to one input terminal of an adder 112. The other input terminal of the adder 112 connects with the output terminal of the switch 115. The input terminal of the switch 115 connects with the output terminal of the loop filter 114. The adder 112 adds the interframe prediction signal input from the loop filter 114 through the switch 115 with the output signal of the inverse DCT circuit 111 to generate locally-decoded signals. The output terminal of the adder 112 is connected to the input terminal of the motion compensated interframe prediction circuit 113.

A multiplexing circuit 116 multiplexes the decision signal sent from the intra/interframe prediction selector 105, the signal output from quantizing circuit 108, valid-/invalid decision signal sent from the valid/invalid decision circuit 109, motion vector information sent from the motion compensated interframe prediction circuit 113, and filter on/off signal sent from the loop filter 114. The output terminal of the multiplexing circuit 116 is connected to the input terminal of a variable length encoding circuit 117. The output terminal of the variable length encoding circuit 117 is connected to the write terminal of a buffer memory 118 for matching the amount of information generated by the encoding apparatus with the transmission rate. The readout terminal of the buffer memory 118 is connected to a transmission line. The buffer memory 118 has a function for generating the information showing the buffer capacity and the information is supplied to an coding control circuit 119. The coding control circuit 119 controls the quantizing circuit 118 and the valid/invalid decision circuit 109 according to the buffer amount.

Operations of the encoding apparatus of this embodiment are described below according to FIGS. 1 and 2A through 2D.

Video signals are sequentially input to the image input terminal 100 in frames. The video signal is, for example, obtained by encoding analog image signals obtained through picking-up of a human with a TV camera (not illustrated) into luminance signal Y and two types of color signals (or color-difference signals) $C_B$ and $C_R$ and converting these encoded signals into digital data called CIF or QCIF by an A-D converter and format converter (not illustrated). The image signal is written in the frame memory 101 as frame data one frame by one frame. The frame data written in the frame memory 101 is read out every a plurality of blocks and supplied to the facial region detecting circuit 102 and low-pass filter 103. The data can also be read out every frame. The data readout unit is larger than the block size (8 pixels×8 pixels) which is the conversion unit (encoding unit) in the DCT circuit 107. The face detecting circuit 102 detects the facial region in the current frame data by obtaining the difference between the current frame data newly input from the frame memory 101 and the previous frame data stored in the internal frame memory in macroblocks and outputs the region specifying signal to identify whether each macro-block in the current frame data belongs to the facial region or other regions. The facial region detecting circuit 102 updates the data in the memory frame by the current frame data every macro-block for which facial region detection is completed.

Figure 2B:
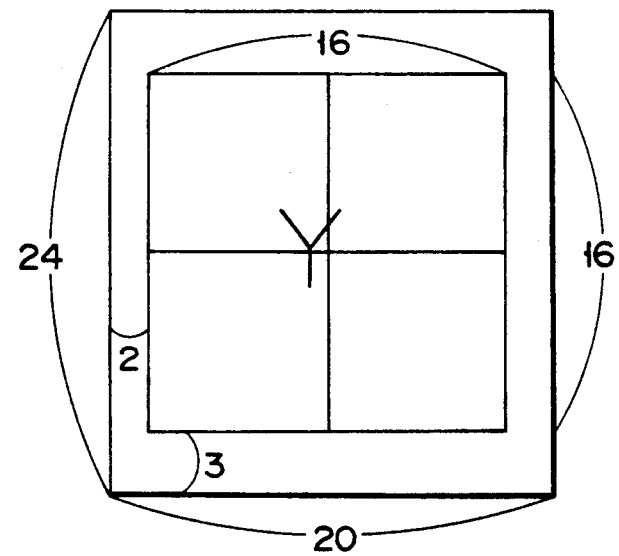
Figure 2C:
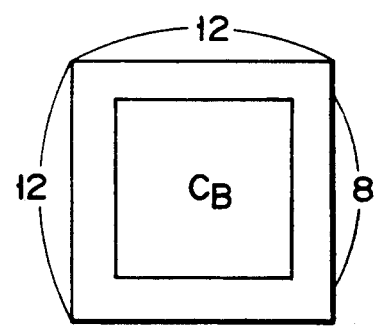
Figure 2D:
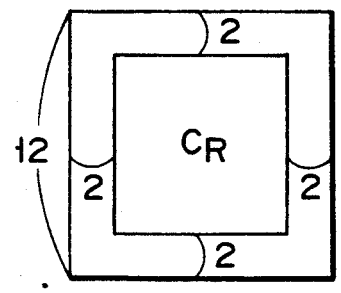

The low-pass filter 103, as mentioned in detail later, having spatial and/or temporal low-pass characteristic. The following is the description of spatial filtering in the space direction by the low-pass filter 103. Since a plurality of blocks and pixels around the blocks are required for spatial filtering the blocks, the data in the frame memory 101 is read out for each unit having the blocks and pixels. For the size of 24 pixels×16 pixels consisting of the luminous signal Y and color-difference signals $C_B$ and $C_R$ whose readout unit is equal to the size of the macro-block specified in H. 261 as shown in FIG. 2A, frame data is input to the low-pass filter 103 from the frame memory 101 in regions having the size of 32 pixels×24 pixels including the luminous signal Y and color-difference signals $C_B$ and $C_R$ as shown in FIGS. 2B through 2D. The low-pass filter 103 converts the currently-input macro-block into the previously-specified macro-block format data (macro-block data) without filtering if the macro-block belongs to the facial region but converts the macro-block into macro-block data after filtering if it belongs to regions other than the face region.

The output of the low pass filter 103 is supplied to one input terminal of the subtracter 104 and also to the inter/interframe prediction selector 105. The subtracter 104 produces an interframe difference signal by subtraction of the output signal of the low-pass filter 103 and the interframe prediction signal sent from the loop filter 114. The intra/interframe prediction selector 105 compares the power of the differential signal output by the subtracter 104 with that of the signal output by the low-pass filter 103 in macro-blocks and decides interframe prediction if the former is smaller and intraframe prediction if the latter is smaller. The switch 106 selects the differential signal sent from the subtracter 104 if the decision by the intra/interframe prediction selector is interframe prediction and the output signal of the low-pass filter 103 if it is intraframe prediction.

The signal selected by the switch 106 is DCT-encoded by the DCT circuit 107 and DCT coefficient data is generated. DCT coefficient data is quantized by the quantizing circuit 108 and quantizing-table numbers and quantizing indexes, for example, are output as quantization results. The output of the quantizing circuit 108 is inversely quantized by the inverse quantizing circuit 110 and also inversely discrete-cosine-transformed by the inverse DCT circuit 111. The locally-decoded data obtained through inverse DCT is stored in the frame memory built in the motion compensated interframe prediction circuit 113 and referenced so that the next frame data will be encoded. That is, the motion compensated interframe prediction circuit 113 compares the locally-decoded data of the previous frame stored in the built-in frame memory with the current frame data sent from the low-pass filter 103 to generate motion vector information. The motion compensated interframe prediction circuit 113 also selects the macro-block data corresponding to the motion vector information among locally-decoded data using the variable delay circuit and supplies the macro-block data to the loop filter 114 as interframe prediction signal. The loop filter 114 is composed of a spatial filter, which eliminates noises contained in the interframe prediction signal sent from the motion compensated interframe prediction circuit 113 to supply the signal to the subtracter 104.

DCT coefficient data is also input to the valid/invalid decision circuit 109. The valid/invalid decision circuit 109 calculates the signal power for each block with the DCT coefficient data and compares the signal power with the threshold value to decide whether the block is valid or invalid.

The decision signal sent from the intra/interframe prediction selector 105, quantizing table number and quantizing index sent from the quantizing circuit 108, valid/invalid decision signal sent from the valid/invalid decision circuit 109, motion vector information sent from the motion compensated interframe prediction circuit 113, and filter on/off signal sent from the loop filter 114 are multiplexed by the multiplexing circuit 116 according to the specified format. The output of the multiplexing circuit 116 is converted into variable length code (e.g. Huffman code) by the variable length encoding circuit 117. The output of the variable length encoding circuit 117 is written in the buffer memory 118 and read out at the speed to be matched with the transmission rate. Read-out signals are sent to the transmission line.

The buffer memory 118 also generates the information indicating the buffer amount and the information is supplied to the coding control circuit 119. The coding control circuit 119 estimates the currently generated information amount of the encoding apparatus with the information of the buffer amount and controls the quantizing circuit 108 and valid/invalid decision circuit 109 according to the estimated result. Concretely, for a large amount of generated information, the circuit 119 decreases the generated information amount by increasing the quantizing step size in the quantizing circuit 108 or increasing the threshold value for decision with the valid/invalid decision circuit 109. For a small amount of generated information, the circuit 119 increases the generated information amount through inverse operation. It is possible to use adaptive frame-drop control instead of changing the quantizing step size.

In the image encoding apparatus of this embodiment mentioned above, macro-blocks in regions other than the facial region among image signals input to the terminal 100 are filtered by the low-pass filter 103 and their high-frequency components are removed or suppressed. The operation can decrease the quantizing bit number to be distributed to regions other than the facial region because the information amount generated due to the high-frequency components is decreased. This method can realize improvement of the image quality of the facial region or the subjective image quality without making remarkable distortion such as block distortion is prevented from occurring in regions other than the face region.

In the facial region detecting circuit 102, detection is executed in macro-block as previously mentioned. Filtering by the low-pass filter 103 is applied to macro-blocks in the facial region and pixels signals around the region according to the region specifying signal from facial region detecting circuit 102. Therefore, the resolution of the facial region detecting circuit 102 is enough if the circuit is able to identify whether the entire noticed macro-block belongs to the face region or other regions. However, if higher resolution can be obtained, it is possible to include the information indicating the position of the boundary between the facial region and other regions in the region specifying signal to be sent from the facial region detecting circuit 102 to the low-pass filter 103. As a result, the low-pass filter 103 can apply filtering only to regions other than the facial region in a macro-block when the boundary crosses the macro-block. According to the above method, the encoding efficiency is further improved and more natural images can be obtained because the boundary of a region with a different band width is not generated in regions other than the facial region.

The encoding apparatus of the present invention can easily be embodied because only the facial region detecting circuit 102 and the low-pass filter 103 for selectively filtering face-region image signals for the region specifying signal sent from the facial region detecting circuit 102 are added to a conventional image encoding apparatus and the circuit configuration after encoding and the encoding control may be basically the same as those of normal encoding apparatuses.

The present invention can also be applied to the system using, for example, DPCM (Differential PCM) other than DCT encoding system as the encoding system In other words, the present invention can be applied to every encoding system using the correlation in the space direction.

The following is the description of practical examples of how to detect facial region in the facial region detecting circuit 102 in FIG. 1 according to FIG. 3.

FIG. 3 shows an interframe difference image input to the facial region detecting circuit 102. Information for the interframe difference image is converted into binary data of "0" or "1" by the preset first threshold level. Then the number of pixels having the binary data value of "1" or the value equal to or more than the first threshold value is counted in the vertical and horizontal directions of the screen and histograms of the pixels (x-and y-axis histograms) are formed. Facial detection is executed according to the histograms.

Face detection starts with the top of a head 30. The top of the head 30 is detected by searching the y-axis histogram from the top and selecting the point Ys which first exceeds the present second threshold value.

After the top of the head 30 is detected, the left end 31 and right end 32 of the head 30 are detected by searching the x-axis histogram from the left and right and selecting the points Xs and Xe which first exceed the second threshold value. In this case, the y-axis histogram is formed only for the region with the width of Δ from the top of the head 30 so that the region with the width of a shoulder 34 will not be detected. Thus, the y-axis histogram with the width of the head can be obtained. The width Δ is, for example, determined by the following formula by assuming the image size as X×Y.

$$\Delta = (Y - Ys) \times \beta$$

$$\beta = \tfrac{1}{4}(\text{or } 1/5)$$

Then, the bottom end of the facial region is decided. To decide the bottom end of it, the head hight is obtained by multiplying the head width by a certain ratio r. The r values of 1.3 to 1.6 are proper. The bottom end of the facial region is obtained by adding the head length to the value for the top of the head previously detected. The facial region is specified by a rectangle 50 designated by coordinates Xs, Xe, Ys, and Ye as shown in FIG. 5.

FIG. 4 shows another face-region detecting method. For the method in FIG. 3, coordinates Xs, Xe, Ys, and Ye are obtained with the resolution in pixels. For the method in FIG. 4, however, the interframe difference image is divided into a plurality of blocks 40 with a certain size. The size of the block 40 may be smaller than or equal to the size of the encoding block. In the block 40, the number of pixels exceeding the preset first threshold value is counted. Then, the counted number of pixels in the block 40 is compared with the second threshold value starting with the top left of the frame. In this comparison, the y-coordinate Ys of the block in which the counted value first exceeds the second threshold value is detected as the top of the head 30. Then, among blocks in which said counted value exceeds the second threshold value, the coordinate of the block 41 having the left-end coordinate is obtained as the left-end coordinate Xs of the facial region and the coordinate of the block 42 having the right-end coordinate as the right-end coordinate Xe of the facial region, within the range of the width Δ (Δ is determined, for example, similarly to the method in FIG. 4). The bottom-end coordinate Ye of the facial region is determined, for example, by the method in FIG. 3. The facial region is specified by the rectangle 50 designated by coordinates Xs, Xe, Ys, and Ye also through this method as shown in FIG. 5.

Figure 6:
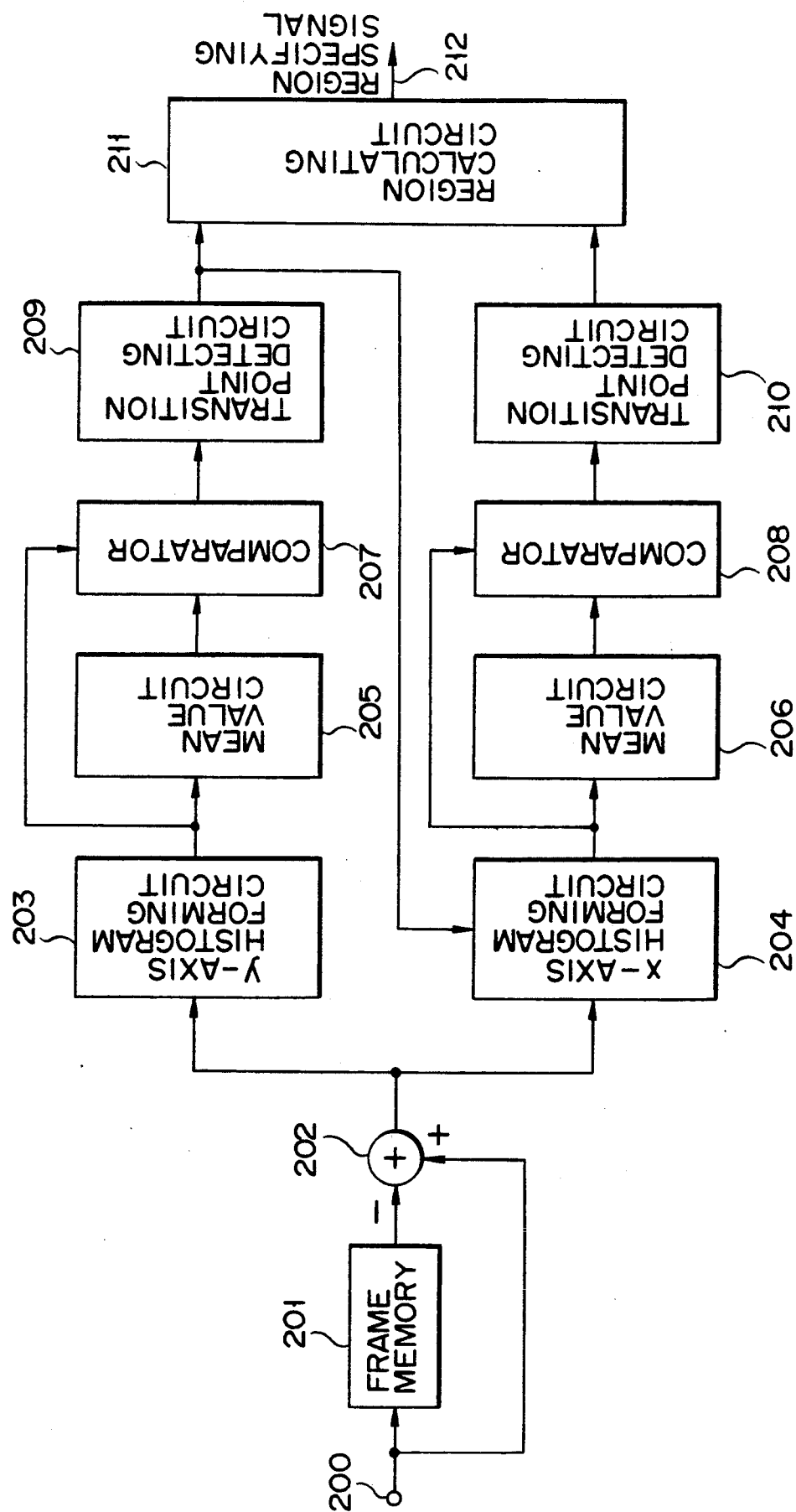
FIG. 6 is a block diagram showing a configuration of the facial region detecting circuit in FIG. 1.

FIG. 6 shows a facial region detecting circuit using the principle in FIG. 3. In this facial region detecting circuit, the x-axis histogram shown in FIG. 7B and the histogram shown in FIG. 7C are formed by the frame difference image shown in FIG. 7A. By extracting the coordinates of the transition points of these histograms, the face region is specified by a rectangle as shown in FIG. 5. It is considered that many signal components of the frame difference image are generated at such a movable portion as shoulder. Therefore, the x-axis histogram including the shoulder portion is formed which is shown above the line B-B' in FIG. 7B. Thus, the vertical region of the inter-block difference image is limited in which the x-axis histogram is formed using the y-axis histogram. As a result, the x-axis histogram of the facial region excluding the shoulder portion shown above the line A-A' in FIG. 7B is obtained.

In FIG. 6, image signals sent from the frame memory 101 in FIG. 1 are input to a terminal 200. A frame memory 201 delays the input image signal by the time for one frame. A subtracter 202 outputs frame difference image signals by subtracting the image signal output by the frame memory 201 from said input image signal. Histogram forming circuits 203 and 204 form y-axis and x-axis histograms with the interframe difference image signal respectively. It is also possible to form x-axis and y-axis histograms using an inter field difference image instead of the interframe difference image. Mean value circuits 205 and 206 obtain mean values from the formed y-axis and x-axis histograms. Comparators 207 and 208 use these mean values as threshold values to compare these values with histograms formed by the transition point detecting circuit 203 and 204 respectively.

Transition point detecting circuits 209 and 210 detect the coordinates of x-axis and y-axis histograms and output coordinate data. The output of the transition point detecting circuit 209 corresponding to the y-axis is supplied to the x-axis histogram forming circuit 204 in order to determine the range for forming the y-axis histogram. Each of the histogram forming circuits 203 and 204 comprises, for example, a thresholding circuit 301, counter 302, memory 303, and coordinate address control circuit 304 as shown in FIG. 8.

Coordinate data output by the transition point detecting circuits 209 and 210 is supplied to a region calculating circuit 211. The region calculating circuit 211 outputs region specifying signal 212 for discriminating the facial region from other regions by using the rectangular region 50 including the coordinates Xs, Xe, Ys, and Ye of the transition points of x-axis and y-axis histograms shown in FIG. 5 as the facial region. The region specifying signal 212 uses, for example, one-bit data which is set to "0" when the image signal input to the terminal 200 belongs to the facial region and to "1" when it belongs to other regions.

FIG. 9 shows another example of the facial region detecting circuit in FIG. 3. This facial region detecting circuit comprises a histogram memory 401 which is an external circuit for forming histograms, frame memory 402, counter 403, address generator 404, comparator 405, subtracter 406, adder 407, selectors 408 through 411, and CPU 412. The facial region detecting circuit detects the facial region with the following three stages (a) through (c). In FIG. 9, signal flows in stages (a), (b), and (c) are shown by a solid line broken line, and one-dot chain line respectively.

(a) Writes frame data in the frame memory 402.

(b) Obtains the interframe difference image signal between the frame data in the frame memory 402 and the next frame data to form x-axis and y-axis histograms using the signal.

(c) Executes calculation by the CPU 411.

Calculation results by the CPU 411 are output as the region specifying signal consisting of map data according to the request from the image encoding apparatus. The stage (c) further comprises the following four stages: (1) detection of facial region, (2) judging of the validity of the of detection results, (3) map generation, and (4) output of map data.

The low-pass filter 103 is described below according to FIG. 1.

As previously mentioned, filtering by the low-pass filter 103 uses any one of the methods to execute filtering in the space direction, to execute filtering in the temporal direction, and to execute filtering by combining the above two methods.

FIG. 10 shows a low-pass filter to execute filtering in the space direction. In FIG. 10, a pixel memory 501 and line memory 502 delay the output signal of the filter by the time for one pixel and for one line respectively. The output terminals of these memories 501 and 502 are connected to an adder 502. The output signal of the adder 03 is halved through bit shift before it is connected to a subtracter 504. Said bit shift is realized only by connecting the output line of the adder 503 with the input line of the subtracter 504 but no special hardware is necessary. The output of the subtracter 504 is connected to the input of a coefficient multiplier 505 for multiplying the coefficient $\alpha(0<\alpha<1)$. The coefficient comprises a ROM (read only memory), for example, and the output signal of the subtracter 504 and the region specifying signal sent from the facial region detecting circuit 102 are input to the address input terminal. An adder 506 adds the output signal of the coefficient multiplier 50 with the input signal of the filter to generate the output signal of the filter.

In the low-pass filter, the pixel value of a pixel preceding by one pixel from the current pixel and that of a line preceding by one line from the current line of the input image signal are averaged by the pixel memory 501, line memory 502, and adder 503, and through bit shift (halving). The difference between the average value and the pixel value of the current pixel is obtained by the subtracter 504. The difference is multiplied by $\alpha$ by the coefficient multiplier 505 and added with the pixel value of the current pixel by the adder 506. Thus, the output signal is obtained in which filtering of low pass characteristic is executed in the space direction.

The output signal of the subtracter 504 is input to the ROM of the coefficient multiplier 505 as a part of address data and the region specifying signal 212 sent from the facial region detecting circuit 102 is input to it as other part of address data. In the address corresponding to the region specifying signal ("0") of the face region in the ROM, data with zero value is stored. In the address corresponding to the region specifying signal ("1") of regions other than the facial region, data obtained by multiplying the input data (output signal of the subtracter 504) corresponding to the address by the coefficient $\alpha$ is stored. Therefore, when image signals other than the facial region are input to the low-pass filter, the output signal value of the coefficient multiplier 505 comes to 0. Thus, the output signal of the adder 506 is equal to the input image signal. That is, the input image signal is directly output from the filter in the facial region and the image signal provided with filtering of low pass characteristic is output from it in regions other than the facial region.

FIG. 11 shows a low-pass filter to execute filtering in the temporal direction. The output of a frame memory 601 for delaying the output signal of the filter by the time for one frame is connected to a subtracter 602. The subtracter 602 subtracts input signal from the output signal of the frame memory 601. The output of the subtracter 602 is connected to a coefficient multiplier 603 for multiplying the coefficient $\beta(0<\beta<1)$. The coefficient multiplier 603 comprises a ROM. The output signal of the subtracter 602 and the region specifying signal 212 sent from the facial region detecting circuit 102 are input to the address input of the ROM. An adder 604 adds the output signals of the coefficient multiplier 603 with the input signal of the filter to generate filter output signals.

In the low-pass filter, the interframe difference signal between the filter output signal of the previous frame stored in the frame memory 601 and the current-frame image signal is obtained by the subtracter 602. The frame difference signal is multiplied by $\beta$ by the coefficient multiplier 603 and added with the input signal by the adder 604. Thus, the output signal provided with low-pass filtering in the temporal direction is obtained. Because this low-pass filter is a recursive-type linear filter, the filtering effect of the filter increases as $\beta$ approaches "1". Similarly to the coefficient multiplier 505 in FIG. 10, the ROM of the coefficient multiplier 603 stores zero-value data address corresponding to the region specifying signal of the facial region and, in the address corresponding to the region specifying signal data of regions other than the facial region, it stores the data obtained by multiplying the input data (output signal of the subtracter 602) corresponding to the address by the coefficient $\alpha$. Therefore, the input image signal is directly output from the filter in the facial region and the image signal provided with filtering of low-pass characteristic from it in regions other than the facial region.

FIG. 12 shows another example of the low-pass filter for executing filtering in the temporal direction. In FIG. 12, the coefficient multiplier 603 in FIG. 11 is replaced with a nonlinear circuit 605. The nonlinear circuit 605 comprises a ROM which stores zero-value data in the address corresponding to the region specifying signal of the facial region and, in the address corresponding to the region specifying signal of regions other than the facial region, it stores the data obtained by multiplying the input data (output signal of the subtracter 602) corresponding to the address by the coefficient for giving the specified nonlinear input-output characteristic.

Input-output characteristic of the nonlinear circuit 605 is shown in FIGS. 13A and 13B. For the input-output characteristic in FIG. 13A, a nonlinear filter is realized which applies low-pass filter effect only to small amplitude regions. The characteristic is effective in eliminating small-amplitude noises. For the input-output characteristic in FIG. 13B, small-amplitude noises are eliminated and low-pass filter effect in the temporal direction is applied to the motion part of image signals. The nonlinear circuit 605 can also be configured so that the input-output characteristics in FIGS. 13A and 13B will be interchanged. In this case, the characteristic in FIG. 13A is set to the image signal of facial region and that in FIG. 13B is set to the image signal of regions other than the facial region.

For the method to execute filtering of low-pass characteristic in the temporal direction, the image signal of a stationary portion such as background is not degraded in its resolution because the interframe difference does not increase.

Figure 14:
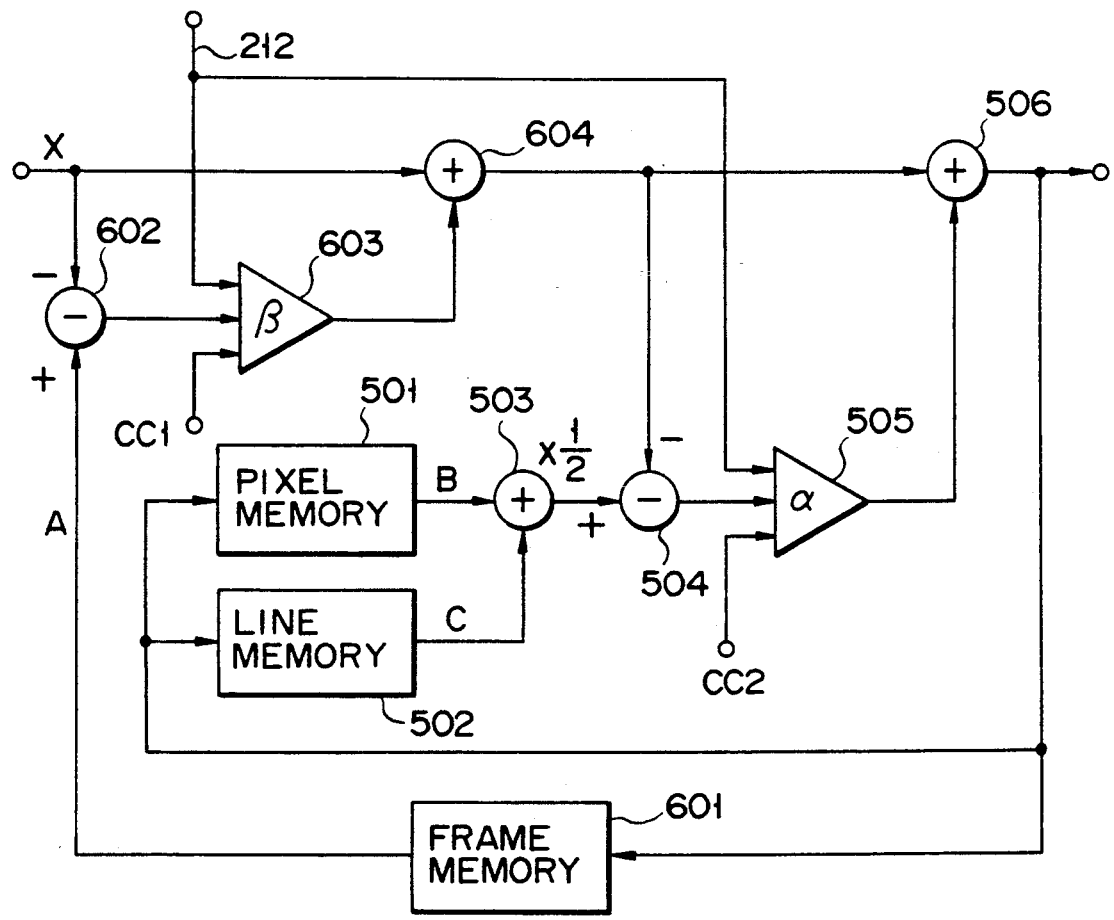
FIG. 14 is a block diagram of still another example of the low-pass filter in FIG. 1.

FIG. 14 shows a low-pass filter made by combining a low-pass filter in the space direction with that in the temporal direction.

Figure 15:
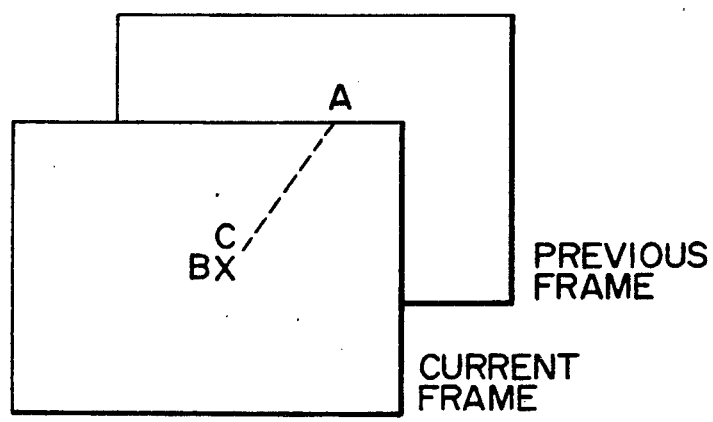
FIG. 15 is a view for explaining the operation of the low-pass filter in FIG. 14.

In FIG. 14, the portions corresponding to FIGS. 10 and 11 are provided with the same symbol. This low-pass filter comprises a recursive-type filter using values of pixels at points X, A, B, and C in FIG. 15. When the value of the pixel X is input to the filter, the value of the pixel B is held by the pixel memory 501 and the value of the pixel C by the line memory 502. Thus, low-pass filtering in the space direction is executed through the adder 503, bit shift ($\times \frac{1}{2}$), subtracter 504, coefficient multiplier 505, and adder 506 similarly to the low-pass filtering in FIG. 10. When the value of the pixel A is given to the filter from the frame memory 601, low-pass filtering in the temporal direction is executed through the subtracter 602, coefficient multiplier 603, and adder 604 similarly to the low-pass filtering in FIG. 11.

It is desirable because of the following reason that multiplication coefficients $\alpha$ and $\beta$ of the coefficient multipliers 505 and 603 can externally be controlled. Degradation of image quality differs in low-pass filters in the space and temporal directions. That is, for the low-pass filter in the space direction, resolutions of background and motion region are equally degraded. For the low-pass filter in the temporal direction, however, the resolution of background is not degraded. When low-pass filtering in the temporal direction is executed, however, blur which looks like leaving a tail with time occurs in the motion region and the degree of the blur depends on the image movement. Appearance of the image degradation greatly depends on the bit rate of encoded data and image movement.

If the multiplication coefficients $\alpha$ and $\beta$ or filter coefficients are variable, the appearance of image degradation can be controlled by changing the filtering intensity of the low-pass filters in the space and temporal directions respectively while maintaining the effect of information amount decrease which is the object of the present invention. If users can perform the above control, they are able to change the quality of decoded images according to their preference. The multiplication coefficients $\alpha$ and $\beta$ can be changed by, for example, giving the data for specifying the values of $\alpha$ and $\beta$ to the ROMs of the coefficient multipliers 505 and 603 as a part of address data.

Though the low-pass filter 103 above mentioned comprises a recursive-type filter, it can also be configured by a non-recursive-type filter. Also, the entire region including the facial region and other regions of input image signal can be filterind this case, it is necessary to change the filter characteristic so that regions other than the facial region will more strongly be filtered than the facial region. Therefore, change of hardware is basically unnecessary. It is only necessary to change the contents of the ROMs used for the coefficient multipliers 505, 603, and 605.

Figure 16:
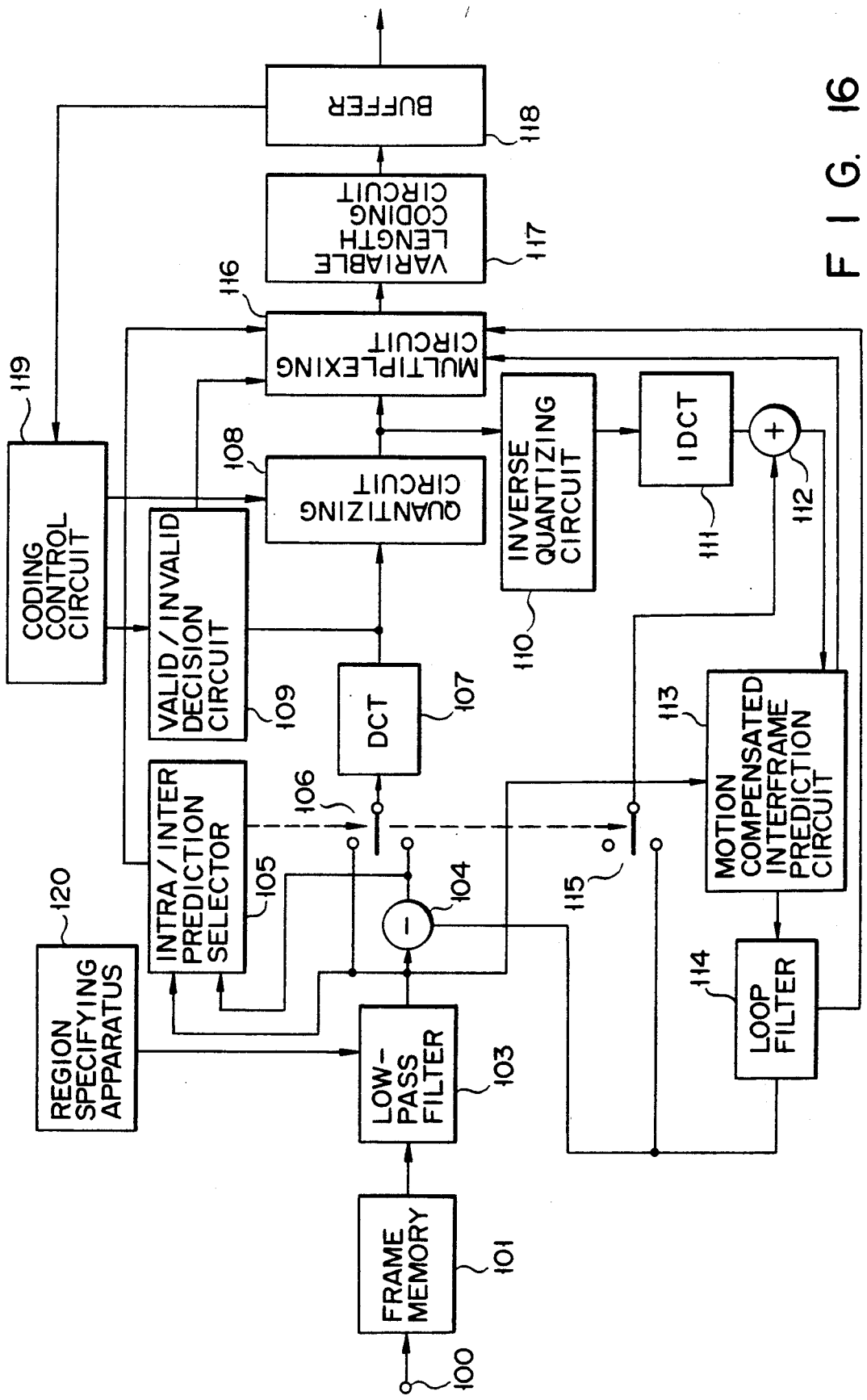
FIG. 16 is a block diagram showing another embodiment of the image encoding apparatus according to the present invention.
Figure 17:
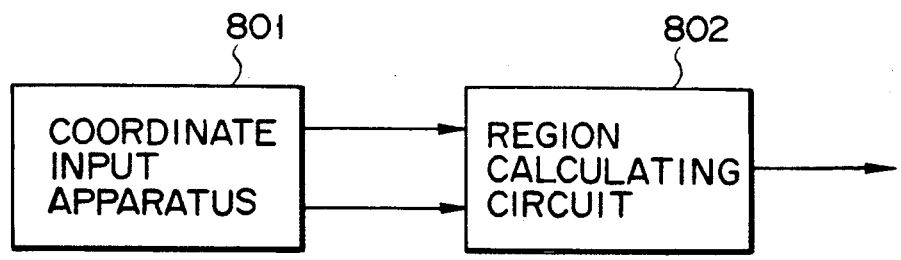
FIG. 17 is a block diagram showing the configuration of the region specifying apparatus used for the apparatus in FIG. 16.
Figure 18:
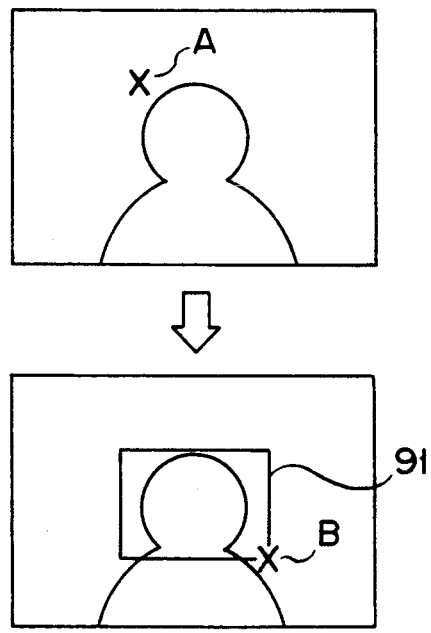
FIG. 18 is a view for explaining a method to specify an input image area in the apparatus in FIG. 16.

Another embodiment is described below according to FIG. 16. In FIG. 16, the portions same as those in FIG. 1 are provided with the same symbols but their descriptions are omitted. In this embodiment, the facial detecting circuit 102 in FIG. 1 is replaced with a region specifying apparatus 120. The region specifying apparatus 120 comprises a coordinate input unit 801 and a region calculating unit 802 as shown in FIG. 17. The coordinate input apparatus 801 is an apparatus in which coordinates can directly be input in numerical values through a keyboard and uses a pointing device such as a mouse and a touch panel. Especially, a mouse or touch panel is very convenient for users because they can input coordinates accurately corresponding to the positions on the screen while viewing the image on the display screen. The region calculating circuit 802 is configured similarly to the region calculating circuit 211 in FIG. 6, which outputs the region specifying signal 803 for discriminating the region specified by a plurality of coordinates sent from the coordinated input apparatus from other regions. To specify a region, two points A and B, for example, are specified by a mouse or touch panel as shown in FIG. 18. Thus, a rectangle 91 with corners A and B is specified. Or, by specifying many points, a polygonal region consisting of the line segments connecting these points is specified. A spline curve can also be used instead of the polygon. For this embodiment, filtering is applied to regions excluding optional specific region which is decided to be important by the user and not restricted to the face region by the low-pass filter 103.

Figure 20:
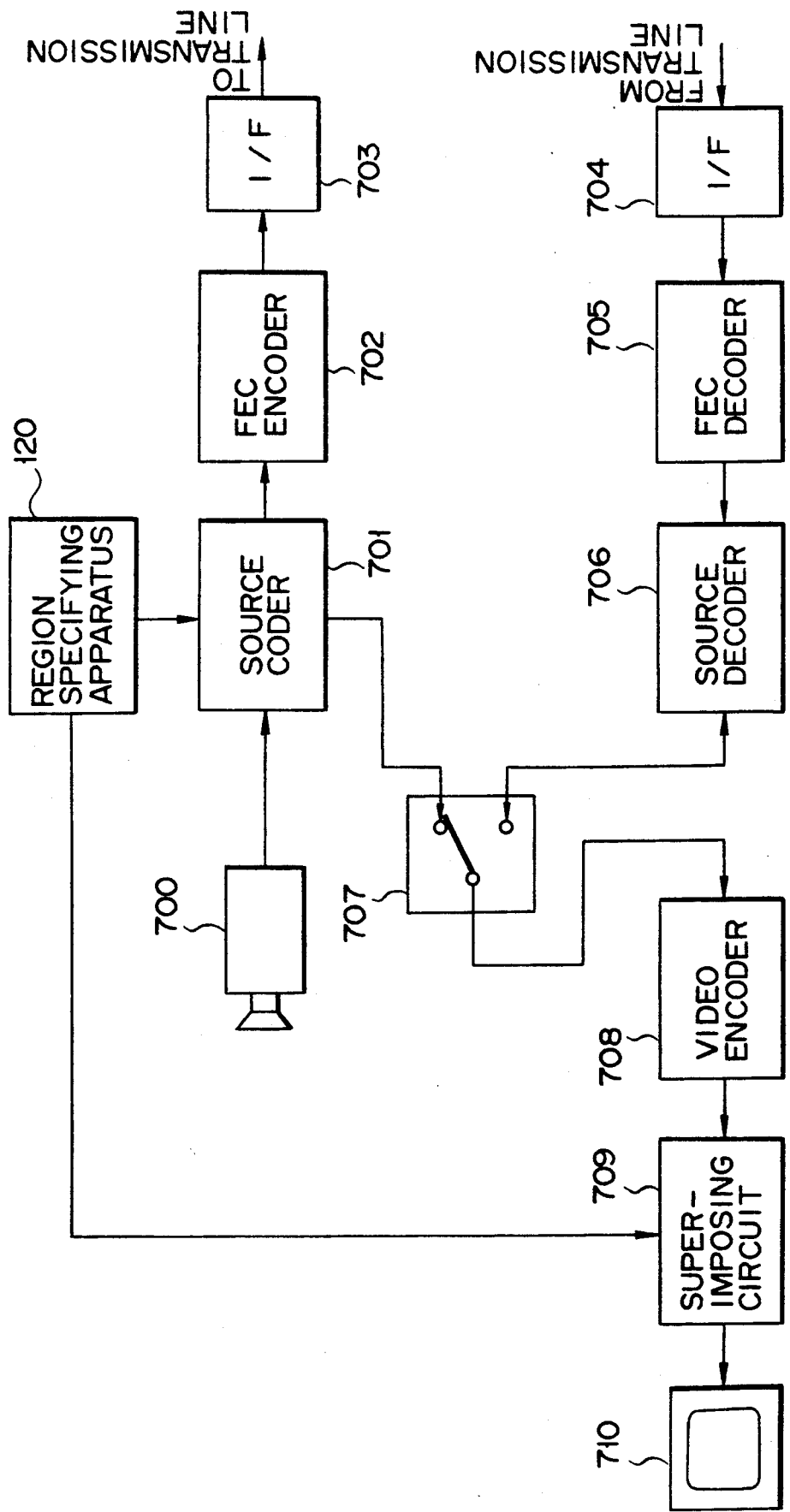
FIG. 20 is a block diagram of an embodiment of the videophone system using the image encoding apparatus according to the present invention.

FIG. 20 shows a video telephone system configured by developing the embodiment in FIG. 16. Source encoder 701 is a unit excluding the facial region detecting circuit 102 in FIG. 1, to which image signals are input from a TV camera 700. The low-pass filter 103 of the source encoder 701 in FIG. 1 connects with the region specifying apparatus 120. The encoded image signal output from the source encoder 701 is forward error-correction-encoded by an FEC encoder 702 and sent to a transmission line through an interface (including the ISDN interface shown in H. 221 "Framing"). Meanwhile, the encoded image signal sent from an other-side terminal through the transmission line is input to an FEC decoder 705 through an interface 704 and forward error-correction-decoded. The error-correction-decoded image signal is decoded by a source decoder 706 configured to execute processing inversely to the source encoder 701 and the decoded image signal is output.

A monitoring-mode selector switch 707 to be operated by users selects the output image signal of the low-pass filter 103 of the source encoder 701 in the self-monitoring mode and the decoded image signal sent from the source encoder 706 in the other-side monitoring mode. Selected image signals are converted into video signals corresponding to such TV system as NTSC, PAL or SECAM by a video encoder 708 and supplied to a monitoring display 710 through a superimposing circuit 709. The region specifying signal sent from the region specifying apparatus 120 is given to the superimposing circuit 709. The superimposing circuit 709 generates the image signal indicating a frame line of a region according to the region specifying signal and superimposes the image signal on the image signal sent from the video encoder 708. Thus, the superimposed frame line is displayed on the screen of the monitoring display 710. Users can confirm the specified region with the displayed frame line.

Figure 19:
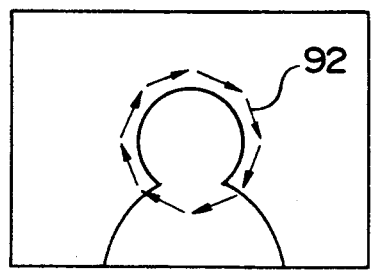
FIG. 19 is a view for explaining another method to specify an input image area in the apparatus in FIG. 16.

In this embodiment, specification of region with the region specifying apparatus 120 is executed for the low-pass filter of the source encoder 701 by the transmitting-side user. In the superimposing circuit 709, the image signal showing the closing line of the region 91 or 92 specified as shown in FIG. 18 or 19 is superimposed on the image signal sent from the video encoder 708.

Meanwhile, the region specifying signal sent from the region specifying apparatus 120 is also supplied to the low-pass filter 103 of the source encoder 701. In the low-pass filter 103, a specific region is obtained similarly to the superimposing circuit 709 and filtering is applied only to the image signals of regions other than the specific region.

In the self-monitoring mode, low-pass-filtered images are displayed on the monitoring display 710. After a region is specified by the region specifying apparatus 120, the region specifying signal is continuously output. Thus, said frame line showing the specified region is superimposed on the image and displayed on the monitoring display 710. The user can confirm the filtering effect in regions other than the specified specific region. Therefore, he can also retry region specification while confirming the effect.

FIG. 21 shows a video telephone system related to still another embodiment. The portions same as those in FIG. 17 are provided with the same symbols and their descriptions are omitted. In this embodiment, region specification to the low-pass filter of the transmitting-side source encoder 701 is executed by the receiving-side region specifying apparatus 120. That is, the coordinate data output from the region specifying apparatus 120 at the encoded-image-signal receiving side is transmitted to the encoded-image-signal transmitting side through the interface 703 and transmission line. For example, when the interfaces 703 and 704 use the framing and protocol according to H. 242, it is possible to open a channel for data transmission at any timing during communication of encoded image signal. Coordinate data can be transmitted using the data transmission channel. At the coded-image-signal transmitting side, received coordinate data is supplied to the low-pass filter of the source encoder 701 through the interface 704. In the low-pass filter, filtering is applied only to the image signals in regions other than the specified specific region among input region specifying signals similarly to the above mentioned.

When filtering of image signals of regions other than the specified region is executed by means of the low-pass filter, the image quality of the specified region is effectively improved. By means of this embodiment, the user at the receiving side can choose a region of interest and transmit to the transmitting side the region specifying signal corresponding to the region of the interest by using the region specifying apparatus 120. The transmitting side then filters the image signals by means of the low-pass filter according to the specifying signal sent from the receiving side. Consequently, according to this embodiment, the user at the receiving side has the advantage of being able to see a chosen region with higher image quality than other regions.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image encoding apparatus for encoding input image signals which correspond to a movable image having a specific region and are sequentially input for every frame, comprising:
   region detecting means for detecting the specific region from said input image signals and outputting a region specifying signal for discriminating specific region from other regions;
   low-pass filter means for selectively filtering in the space direction image signals of regions other than said specific region, which are included in said input image signals, according to said region specifying signal; and
   coding means for orthogonal transformation coding of image signals output from said low-pass filter means.

2. An image encoding apparatus according to claim 1, wherein said region detecting means detects a part of the specific region from said input image signal, the movable image including a human body and a background, and said specific region corresponding to a head of the human body.

3. An image encoding apparatus according to claim 1, wherein said region detecting means comprises means for generating coordinate data corresponding to a plurality of points on the boundary between said specific region and other regions and means for generating said region specifying signal in accordance with said coordinate data.

4. An image encoding apparatus according to claim 1, wherein said region detecting means comprises storing means for sequentially storing input image signals of at least one frame which correspond to a human body and a background, subtracting means for calculating a interframe difference image signal between image signals of one frame read out of the storing means and those of one new frame, means for forming x-axis and y-axis histograms with said interframe difference image signal, means for generating coordinate data corresponding to the top and side of said head with said x-axis and y-axis histograms, and means for generating said region specifying signal with said coordinate data.

5. An image encoding apparatus according to claim 1, wherein said low-pass filter means filters image signals of regions other than said specific region every unit larger than encoding unit with the predetermined size.

6. An image encoding apparatus according to claim 1, wherein said low-pass filter means comprises the first low-pass filter mean for filtering in the space direction, the second low-pass filter means for filtering in the temporal direction, and means for connecting the output of either said first or second filter with the input of the other filter.

7. An image encoding apparatus according to claim 6, wherein said low-pass filter means further comprises mean for respectively controlling the filtering intensity of said first and second filter means.

8. An image encoding apparatus according to claim 1, wherein said low-pass filter means comprises multiplying means for multiplying said image signal by a predetermined coefficient and means for practically setting said coefficient to zero for the image signal of said specific region according to said region specifying signal.

9. An image encoding apparatus according to claim 8, wherein said multiplying means include a read only memory to whose address input said input image signal and said region specifying signal are input.

10. An image encoding apparatus according to claim 1, wherein said low-pass filter means comprises nonlinear circuit means for receiving said input image signal and control mean for controlling the input-output characteristic of said nonlinear circuit according to said region specifying signal.

11. An image encoding apparatus according to claim 10, wherein said control means sets the gain of said nonlinear circuit means for the image signal of said specific region to zero.

12. An image encoding apparatus according to claim 10, wherein said nonlinear circuit means includes a read only memory to whose memory address said input image signal and said region specifying signal are input.

13. An image encoding apparatus for encoding input image signals which correspond to a movable image having a specific region and are sequentially input for every frame, comprising:
    region detecting means for detecting the specific region from said input image signals and outputting a region specifying signal for discriminating specific region from other regions;
    low-pass filter means for filtering in the space direction image signals so that image signals of regions other than said specific region will be filtered more strongly than the image signal of said specific region according to said region specifying signal; and
    coding means for orthogonal transformation coding of image signals output from said low-pass filter means.

14. An image encoding apparatus for encoding input image signals, comprising:
    region specifying means for outputting a region specifying signal to discriminate any specific region from other regions in said input image signals;
    low-pass filter means for selectively filtering in the space direction image signals of regions other than said specific region in said image signals; and
    coding means for orthogonal transformation coding of image signals output from said low-pass filter means.

15. AN image encoding apparatus according to claim 14, wherein said region specifying means comprises coordinate input means for inputting at least two optional coordinate data values; and
    means for generating said region specifying signal in accordance with said coordinate data.

16. An image encoding apparatus according to claim 14, further comprising:
    displaying means for displaying images according to image signals output from said low-pass filter means; and
    superimposing means for superimposing the information indicating said specific region on the image to be displayed according to said region specifying signal.

17. An image encoding/decoding apparatus for encoding and transmitting input image signals at a transmitting side and decoding an encoded image signals at a receiving side, comprising:
    region specifying means for specifying a specific region in said input image signal and outputting a region specifying signal for discriminating the specific region from other regions in said input image signals;
    transmitting means for transmitting the region specifying signal output from said receiving side to said transmitting side;
    low-pass filter means for selectively filtering in the space direction image signals of regions other than the specific region, which are included said input image signals, according to said region specifying signal from the receiving side; and
    coding means for orthogonal transformation coding of image signal output from said low-pass filter means.

18. An image encoding apparatus for encoding input image signals, comprising:
    region specifying means for specifying a specific region in said input image signals and outputting a region specifying signal for discriminating the specific region from other regions in said image input signals;
    low-pass filter means for selectively filtering in the space direction image signals of said specific region, which are included in said input image signals, according to said region specifying signal; and
    coding means for orthogonal transformation coding of image signals output from said low-pass filter means.

19. An image encoding apparatus for encoding input image signals which correspond to a movable image having a specific region and are sequentially input for every frame, comprising:
    region detecting means for detecting the specific region from said input image signals and outputting a region specifying signal for discriminating said specific region from other regions;
    low-pass filter means for selectively filtering in the spatial direction and the temporal direction image signals of regions other than said specific region, which are included in said input image signals, according to said region specifying signal;
    subtractor means for producing interframe difference signals according to image signals output from said low-pass filter means; and
    coding means for orthogonal transformation coding of the interframe signals output from said subtractor means.

* * * * *